Figure 1:
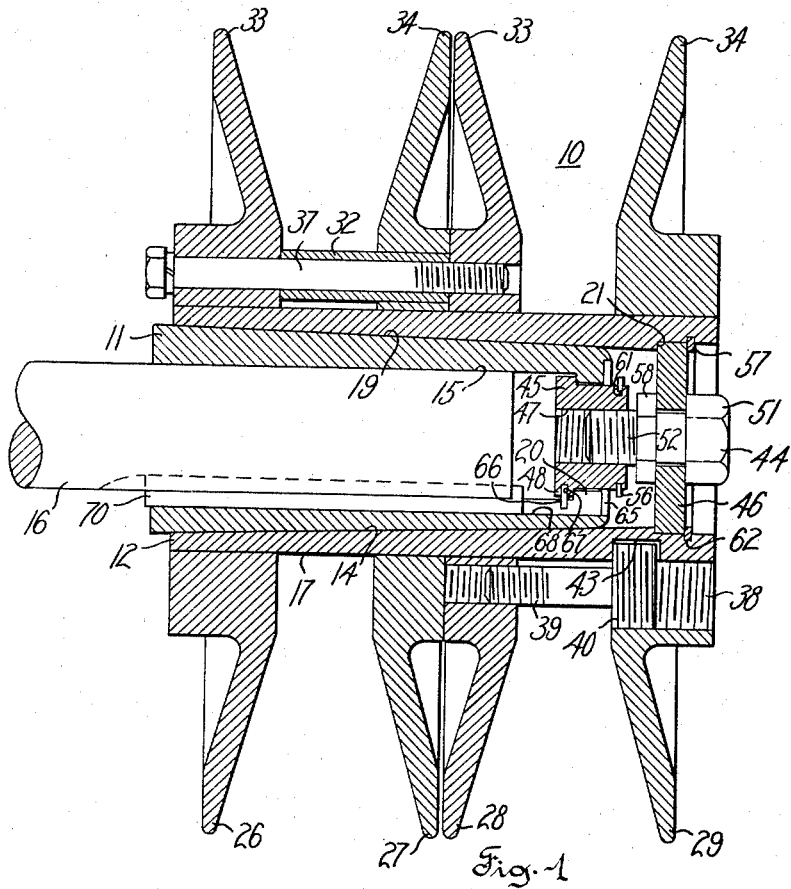

Inventors
Robert D. Powell
Clarence B. Hilgeman
Raymond H. Sporing
by Robert B. Benson
Attorney

United States Patent Office 2,889,161
Patented June 2, 1959

2,889,161

VARIABLE PITCH DIAMETER SHEAVE

Robert D. Powell, Madeira, Ohio, Clarence B. Hilgeman, Florence, Ky., and Raymond H. Sporing, Cincinnati, Ohio, assignors to Allis-Chalmers Manufacturing Company, Milwaukee, Wis.

Application May 24, 1956, Serial No. 586,952

5 Claims. (Cl. 287—52.06)

This invention relates generally to variable pitch diameter sheaves having axially movable disks mounted on a sleeve. More specifically this invention relates to a device for mounting such a variable pitch diameter sheave on a shaft and mounting the axially slidable disk on the sleeve.

One of the biggest problems facing the sheave industry today is that of fretting corrosion. Fretting corrosion is a form of corrosion caused by two surfaces being forcibly rubbed together. In variable pitch diameter sheaves this corrosion occurs during the normal operation of the sheave between the axially movable disks and the sleeve on which they are mounted. During operation the belt pressure on the disks of a variable pitch diameter sheave is continually shifting due to the rotation of the sheave and causes the disks to vibrate and oscillate relative to the sleeve on which they are mounted thereby causing fretting corrosion. This corrosion builds up and makes it difficult and in some cases impossible to move the disks axially along the member upon which they are mounted to vary the pitch diameter of the sheave.

The sheave industry has made many attempts to solve the problem of fretting corrosion on variable pitch diameter sheaves. It is generally conceded that one of the best ways to solve this problem is to mount the disks on a sleeve in a manner such that there will be no movement whatsoever between the disks and the sleeve during the operation of the sheave. One attempt to mount disks on a sleeve so securely that they would not move relative to the sleeve was to use a longitudinally split tapered sleeve and a complementary tapered longitudinally split bushing between the shaft and the disks. To mount the sheave on the shaft, the bushing is drawn into the sleeve thereby causing the sleeve to expand and the bushing to contract. The contracting bushing squeezes the shaft to mount the sheave on the shaft and the expanding sleeve presses against the bores of the disks to securely mount the disks on the sleeve. Structures like the one just described have not been entirely successful in combatting fretting corrosion because the disks are not mounted on the sleeve securely enough to prevent relative movement between them and the sleeve. One of the reasons these prior art structures have not been entirely successful in combatting fretting corrosion is the manner in which the bushing has been drawn into the sleeve. In prior art structures using a split tapered bushing in a split tapered sleeve, the bushing is generally drawn into the sleeve by a series of circumferentially spaced bolts which extend through a radially inward projecting flange on the sleeve and threadedly engage the bushing. These bolts are tightened one at a time to draw the bushing into the sleeve. However, in tightening these bolts one at a time the bushing often becomes cocked in the sleeve and is not pulled into the sleeve as tightly as is desired. If the bushing is cocked within the sleeve during the operation of the sheave the bushing often works itself loose within the sleeve and consequently the disks become loose on the sleeve. This looseness between the sleeve and the disks allows the disks to move relative to the sleeve and hence cause fretting corrosion.

This invention contemplates a variable pitch diameter sheave having a new and improved device for drawing a split tapered bushing into a complementarily split tapered sleeve for mounting a sheave on a shaft which will overcome the problems and difficulties of prior art sheaves as set forth above. The sheave of this invention has a plug positioned within the bore of the bushing. The plug has a longitudinally extending bore and an integral radially outward extending flange which abuts a complementary internally extending flange in the bushing. A thrust plate is provided for abutting a shoulder defined in the internal surface of the sleeve. The thrust plate is axially spaced from the bushing plug in the assembled sheave. An actuating bolt having an enlarged head at one end and a threaded portion at the other end cooperates with the plug and the thrust plate to draw the bushing into the sleeve. The threaded portion of the bolt operatively engages the threaded bore in the bushing plug and the head portion abuts the thrust plate. Upon rotation of the bolt in one direction the head of the bolt exerts a force on the thrust plate in one direction and the threads of the bolt exert a force on the plug in the opposite direction. The thrust plate in turn tends to force the sleeve toward the bushing and the plug tends to force the bushing toward the sleeve. Hence by rotating the bolt the bushing is drawn into the sleeve.

The actuating bolt is provided with a collar intermediate its ends and the sleeve and plug are provided with snap rings positioned in grooves axially spaced from the shoulder and the flange respectively for disengaging the sleeve and the bushing. When the bolt is rotated in the opposite direction the collar exerts a force on the sleeve in one direction and the threads of the bolt exert a force on the plug in the opposite direction to force the bushing out of frictional engagement with the sleeve.

This sheave mounting device of this invention is capable of exerting a greater and a more uniform force on the sleeve and bushing than prior art structures because of the central position of the bolt and because the surface upon which the thrust plate and the flange of the plug act is evenly distributed around the periphery of the shoulder and the flange in the bushing. Hence the sheave will be more securely mounted on the shaft and the disks will be more securely mounted on the sleeve to eliminate fretting corrosion. Furthermore, the sheave of this invention can be more quickly assembled and disassembled than prior art sheaves since only one screw or bolt is used in mounting and dismounting the sheave on the shaft.

Therefore it is the object of this invention to provide a variable pitch diameter sheave having a new and improved mounting device.

Another object of this invention is to provide a new and improved variable pitch diameter sheave having a centrally located mounting device.

Another object of this invention is to provide a new and improved variable pitch diameter sheave mounting device that will materially reduce fretting corrosion between the disks and the sleeve of the sheave.

Another object of this invention is to provide a new and improved variable pitch diameter sheave which can be more quickly and easily mounted and dismounted than prior art sheaves.

Figure 2:
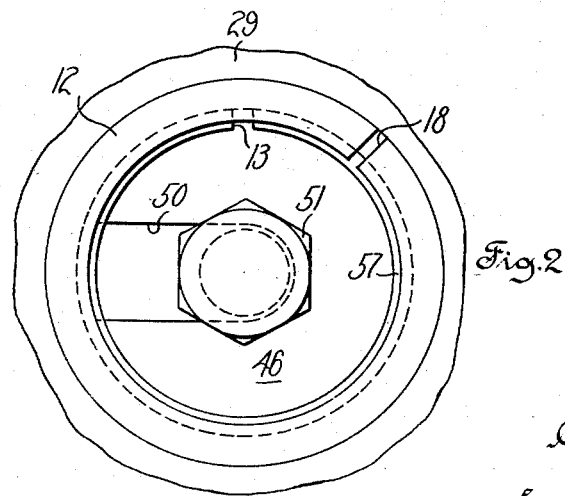

Objects and advantages other than those set forth above will be apparent from the following description when read in conjunction with the drawings, in which:

Fig. 1 is a cross sectional view of a variable pitch diameter sheave embodying the mounting device of this invention; and Fig. 2 is a right end view of the sheave shown in Fig. 1.

This invention is illustrated in a variable pitch diameter sheave 10 having a bushing member 11 and a sleeve member 12 mounted thereon. The bushing member 11 is split longitudinally throughout its entire length as at 13 and has a tapered external surface 14 and a generally cylindrical internal surface 15 for gripping the shaft 16. The sleeve 12 presents a generally cylindrical external surface 17 and is split longitudinally throughout its entire length as at 18. The internal surface 19 of the sleeve 12 is tapered complementary to the tapered surface 14 of the bushing 11. One of the members 11 or 12 defines a flange and the other a shoulder. The working surfaces of the flange and the shoulder face in opposite directions and are positioned to be engaged to force the bushing into frictional engagement with the sleeve. In the preferred embodiment as shown in the drawings the bushing 11 has an internally extending flange 20 positioned at the end of the bushing 11 having the smaller external diameter and the sleeve 12 has a shoulder 21 cut into its internal surface at the end of the sleeve having the smallest internal diameter. The shoulder 21 is positioned to face away from the bushing 11 when the sheave 10 is assembled.

A plurality of frusto-conical disks such as 26, 27, 28 and 29 are mounted on a cylindrical surface 17 of the sleeve 12. The disks are slidably mounted on the sleeve and cooperate in pairs 26, 27 and 28, 29 to form grooves for driving V-belts. Alternate disks 26, 28 and 27, 29 are rigidly axially spaced by spacers 32, only one of which is shown, and are joined together in sets 34, 33 by bolts 37 for axial movement in unison along the sleeve. An adjusting screw 38 having oppositely threaded portions is provided for moving the sets of disks axially along the shaft toward and away from each other to vary the pitch diameter of the grooves of the sheave. The screw 38 has a threaded portion 39 for operatively engaging a threaded bore in disk 28 of set 33 and an oppositely threaded collar portion 40 for operatively engaging a threaded bore in disk 29 of set 34. The collar 40 fits into a recess 43 in the sleeve 12 to restrain the screw 38 against axial movement relative to the sleeve.

Means are provided for mounting the sheave 10 on the shaft 16 and for securely fixing the frusto-conical disks 26, 27, 28, 29 on the sleeve of the sheave. These means consist of a pair of actuating elements which cooperate with the flange 20 and the shoulder 21 to force bushing 11 and the sleeve 12 toward each other and a bolt 44 which cooperates with these elements. The elements may be referred to as a plug 45 and a thrust plate 46. In the preferred embodiment as shown the plug 45 has a longitudinally extending threaded bore 47 and an integral radially outward extending flange 48 at one end. The flange 48 is designed to engage from the interior of the bushing 11 the complementary internally extending flange 20 of the bushing member. The thrust plate 46 may be of any suitable shape but for reasons hereinafter stated the thrust plate is annular with a radially extending slot 50 shown best in Fig. 2. The thrust plate 46 is positioned so that its outer peripheral section abuts the shoulder 21 in the sleeve 12.

The bolt 44 is provided to cooperate with the plug 45 and the thrust plate 46 to draw the bushing 11 into frictional engagement with the sleeve 12. To this end the bolt 44 is provided with an enlarged head 51 shown as a hexagonal head at one end for engaging the thrust plate 46 and a threaded portion 52 at the other end for operatively engaging the threaded bore 47 of the plug 45. When the bolt 44 is rotated in one direction (for example clockwise) it causes a force to act upon the thrust plate 46 in one direction and on the plug 45 in the opposite direction. This force is transmitted to the bushing 11 and the sleeve 12 and causes the bushing to be drawn into the sleeve. As the bushing 11 is drawn into the sleeve 12 the bushing contracts around the shaft 16 and the sleeve expands into tight fitting relation with the frusto-conical disks 26, 27, 28, 29 mounted on the outer surface of the sleeve.

The mounting means are supplemented with snap rings 56, 57 in the bushing plug 45 and the sleeve 12 respectively and a collar 58 on the bolt 44 for disengaging the bushing 11 and the sleeve 12. The snap rings 56 and 57 are positioned in grooves 61, 62, respectively. The groove 61 is formed in the plug 45 and is positioned to be axially spaced from the face of the flange 48 when the sheave 10 is assembled. The groove 62 is formed in the sleeve 12 and is axially spaced from the face of shoulder 21. When the sheave 10 is assembled the flange 20 will be positioned between the flange 48 and the snap ring 56 on the plug 45 and the thrust plate will be positioned between the shoulder 21 and the snap ring 57 in the sleeve. The snap rings 56, 57 cooperate with the plug 45 and the plate 46, respectively, to disengage the bushing and the sleeve.

The collar 58 is preferably formed integral with the bolt 44 and is axially spaced from the head 51. The thrust plate 46 is positioned on the bolt 44 between the collar 58 and the head 51. The thrust plate has a radially extending slot 50 so that it can be easily mounted on the bolt between the head and the collar. When the bolt 44 is rotated in a counterclockwise direction the threaded portion 52 exerts a force on the bushing plug 45 in one direction and the collar 58 exerts a force on the thrust plate 46 in the opposite direction. These forces are transmitted to the bushing 11 and the sleeve 12 through the snap rings 56, 57, respectively, to force the bushing 11 away from and out of engagement with the sleeve 12. The snap ring construction is used because the snap rings may be conveniently placed in the grooves 61, 62 during the assembly of the unit. Furthermore, the structure required to disengage the bushing and the sleeve does not have to be as rugged as the structure for engaging them. Hence, snap rings could be used for disengaging the sleeve and the bushing but they could not be used for engaging them.

A washer 65 may be provided on the plug 45 between the snap ring 56 and the bushing flange 20. The washer fits closely around the plug and provides for a better transmission of force from the plug to the bushing. Such a washer is needed for transmitting power because the bushing flange often fits loosely around the plug to provide room for the contraction of the bushing around the shaft.

A peg 66 is fitted into a hole 67 in the plug 45 and extends into a keyway 68 in the bushing 11 to prevent rotation of the plug relative to the bushing.

In assembly the bushing 11 is positioned within the sleeve 12. The plug 45 is then placed in the bore of the bushing with the flanges 48 and 20 in abutting relation and the peg 66 extending into the keyway 68. The snap ring 56 is positioned in the groove 61. The thrust plate 46 is then fitted on the bolt 44 between the collar 58 and the head 51. The bolt 44 is then positioned within the small end of the sleeve and threaded into the bore of the plug until the thrust plate 46 engages the shoulder 21. The snap ring 57 is then positioned in the groove 62 to secure the thrust plate between the shoulder and the snap ring. The disks 26, 27, 28, 29 are then mounted on the sleeve, connected in sets and adjusted to the proper pitch diameter. The sheave 10 is then mounted on the rotatable shaft 16 and the bolt 44 rotated clockwise to pull the bushing into the sleeve to expand the sleeve against the disks and contract the bushing around the shaft. Frictional engagement of the different concentrically mounted parts may be relied upon to transmit power from the shaft to the belts in the grooves. However, suitable keys such as the key 70 can be used between the different parts to aid in the transmission of power.

In operation, the bushing 11 and the sleeve 12 are disengaged by turning the bolt 44 in the opposite or counterclockwise direction. The bolt 44 then exerts a force on the snap rings 56, 57 through the plug 45 and the plate 46, respectively, to force the sleeve off the bushing. When the bushing and sleeve are disengaged the disks float loosely upon the sleeve. The position of the disk on the sleeve is then varied by rotating the screw 38 to vary the pitch diameter of the sheave. When the desired pitch diameter is achieved the bolt 44 is turned clockwise to draw the bushing into the sleeve to again mount the sheave on the shaft and the disk on the sleeve.

Although but one embodiment has been illustrated and described it will be obvious to those skilled in the art that various changes and modifications can be made without departing from the spirit of the invention or from the scope of the appended claims.

What is claimed is:

1. Mounting means for attaching a pulley or the like to a shaft, comprising an externally tapered longitudinally split bushing member adapted to be mounted on a rotatable shaft, a complementary internally tapered longitudinally split sleeve member mounted on said bushing, one of said members defining a shoulder and the other member defining a flange, means for drawing said bushing into frictional engagement with said sleeve to mount said pulley on a shaft, said means comprising a plug having longitudinally extended threaded bore and an external flange for engaging said flange of said one member, an actuating screw having a head portion at one end and a threaded portion at the other end, and a thrust plate mounted on said screw adjacent said head for engaging said shoulder of said other member, said threaded portion operatively engaging the threaded bore of said plug and said head operatively engaging said thrust plate whereby rotation of said screw in one direction will draw said bushing into said sleeve to contract said bushing on said shaft and expand said sleeve into locking engagement with said pulley.

2. Mounting means for attaching a pulley or the like to a shaft, said means comprising an externally tapered longitudinally split bushing member adapted to be mounted on a rotatable shaft, a complementary internally tapered longitudinally split sleeve member mounted on said bushing, said sleeve member defining a shoulder, said bushing member defining an internally extending flange, means for drawing said bushing into frictional engagement with said sleeve to mount said sheave on a shaft and said disks on said sleeve, said means comprising a plug having longitudinally extended threaded bore and an external flange for engaging said flange on said bushing, an actuating screw having a head portion at one end and a threaded portion at the other end, and a thrust plate mounted on said screw adjacent said head for engaging said shoulder in said sleeve, said threaded portion operatively engaging the threaded bore of said plug and said head operatively engaging said thrust plate whereby rotation of said screw in one direction will draw said bushing into said sleeve to contract said bushing on said shaft and expand said sleeve into locking engagement with said pulley.

3. Mounting means for attaching a pulley or the like to a shaft, said means comprising an externally tapered longitudinally split bushing adapted to be mounted on a rotatable shaft, said bushing having an inwardly extending flange at its smaller end, an internally tapered longitudinally split sleeve mounted on said bushing, said sleeve defining a shoulder at its end having the smallest internal diameter, means for drawing said bushing into friction engagement with said sleeve to mount said bushing on a shaft and said pulley on said sleeve, said means comprising a bushing plug defining a longitudinally extending bore and having an external radially extending flange for engaging said bushing flange from within said bushing, an actuating screw having an enlarged head portion at one end and a threaded portion at the other end and a thrust plate mounted on said screw adjacent said head and positioned to abut said shoulder, said threaded portion operatively engaging said threaded bore in said bushing plug and said head operatively engaging said thrust plate, whereby rotation of said screw in one direction will draw said bushing into said sleeve to contract said bushing on said shaft and expand said sleeve into locking engagement with said pulley.

4. Mounting means for attaching a pulley or the like to a rotatable shaft, said means comprising an externally tapered longitudinally split bushing adapted to be mounted on a rotatable shaft, said bushing having an inwardly extending flange at its smaller end, an internally tapered longitudinally split sleeve mounted on said bushing, said sleeve defining a shoulder at its end having the smallest internal diameter and a groove intermediate said shoulder and said end, said shoulder facing away from said bushing, means for drawing said bushing into and out of frictional engagement with said sleeve to mount and dismount said pulley on a shaft, said means comprising a plug defining a longitudinally extending bore, said plug having an external radially extending flange for engaging said bushing flange from within said bushing and a groove axially spaced from said flange, snap rings positioned in said grooves, an actuating screw having an enlarged head portion at one end, a threaded portion at the other end and a collar intermediate said ends, and a thrust plate mounted on said screw intermediate said head and said collar, said thrust plate having its outer portion positioned intermediate said shoulder and said snap ring in said sleeve, the outer portion of said bushing flange being positioned intermediate said flange and said snap ring in said plug, said threaded portion of said screw operatively engaging said bore in said plug and said head and said collar cooperating with said thrust plate, whereby rotation of said screw in one direction will draw said bushing into said sleeve to contract said bushing on said shaft and expand said sleeve into locking engagement with said pulley and rotation of said screw in the other direction will force said bushing out of frictional engagement with said sleeve.

5. Mounting means for attaching a pulley or the like to a shaft, said means comprising an externally tapered longitudinally split bushing adapted to be mounted on a rotatable shaft, said bushing having an inwardly extending flange at its smaller end, an internally tapered longitudinally split sleeve concentrically mounted on said bushing, said sleeve defining a shoulder at its end having the smallest internal diameter and a groove intermediate said shoulder and said end, said shoulder facing away from said bushing, means for drawing said bushing into and out of frictional engagement with said sleeve to mount and dismount said bushing on a shaft and said pulley on said sleeve, said means comprising a plug defining a longitudinally extending bore, said plug having an external radially extending flange for engaging said bushing flange from within said bushing and a groove axially spaced from said flange, snap rings positioned in said grooves, an actuating screw having an enlarged head portion at one end, a threaded portion at the other end and a collar intermediate said ends, and a thrust plate having a radially extending slot from its center to its periphery mounted on said screw intermediate said head and said collar, said thrust plate having its outer portion positioned intermediate said shoulder and said snap ring in said sleeve, the outer portion of said bushing flange being positioned intermediate said flange and said snap ring in said plug, a washer closely encircling said bushing plug is positioned intermediate said bushing flange and said snap ring, said threaded portion of said screw operatively engaging said bore in said plug and said head and said collar cooperating with said thrust plate, whereby rotation of said screw in one direction will draw said bushing into said sleeve to contract said bushing on said shaft and expand said sleeve into locking engagement with said pulley and rotation of said screw in the other direction will force said bushing out of frictional engagement with said sleeve.

References Cited in the file of this patent

UNITED STATES PATENTS

| | | |
|---|---|---|
| 2,709,374 | Williams | May 31, 1955 |
| 2,718,155 | Firth | Sept. 20, 1955 |
| 2,723,138 | Knudsen | Nov. 8, 1955 |